Nov. 22, 1932.   P. WOLF   1,888,899
METAL DRUM
Filed May 29, 1930

Inventor
Peter Wolf
by Knight Bros
Attorneys

Patented Nov. 22, 1932

1,888,899

UNITED STATES PATENT OFFICE

PETER WOLF, OF ESSEN, GERMANY, ASSIGNOR TO FRIED. KRUPP AKTIENGESELL-SCHAFT, OF ESSEN-ON-THE-RUHR, GERMANY

METAL DRUM

Application filed May 29, 1930, Serial No. 457,264, and in Germany June 7, 1929.

The invention relates to drums, more particularly those manufactured from stainless steel and intended for liquids which easily acquire a bad taste. The invention has for its object to so improve drums of this class that no impure corners can exist in the drum.

Figure 1:
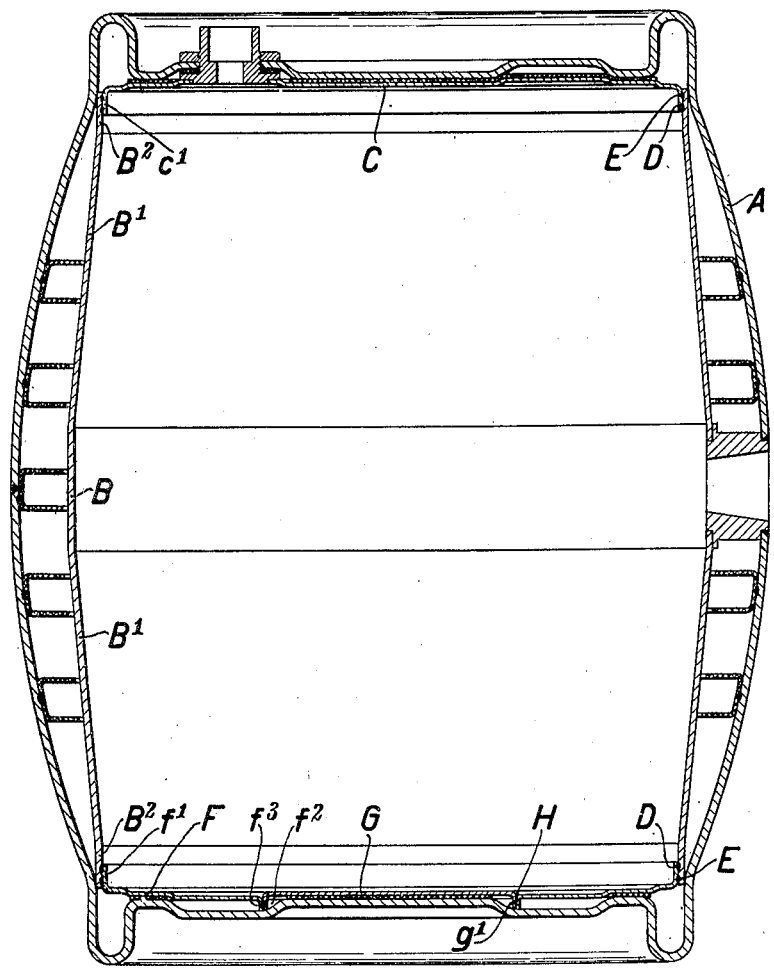
Figure 2:
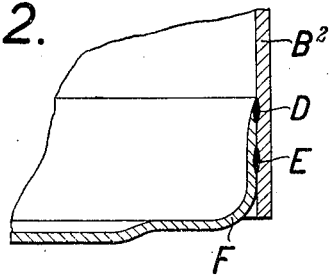

In order that the invention can be more readily understood, an embodiment of a drum manufactured according to the invention is illustrated by way of example in the accompanying drawing in which Figure 1 is a longitudinal section through the drum, and Figure 2 is a detail of the drum illustrated in Figure 1, on an enlarged scale.

The drum is composed of a jacket A preferably made from mild steel, and an inner drum proper which is made from stainless steel and has a comparatively small wall thickness. This drum is protected by jacket A. The shell of the drum proper has a short cylindrical central portion B and two tapering portions $B^1$, $B^1$ which in their turn subside again each into a short cylindrical end portion $B^2$. A front wall C having an inwardly directed flange $c^1$ is inserted by means of the latter in one of the end portions $B^2$ of the drum proper, the flange $c^1$ on its free edge being joined to portion $B^2$ by a tightening welding seam D obtained by resistance welding, and by another welding seam E therebehind. In the same manner another front wall F having an inwardly directed flange $f^2$ is inserted in the opposite drum end $B^2$ and connected thereto likewise by weldings D and E. The front wall F has a central circular aperture $f^2$ serving to introduce the respective members of a resistance welding apparatus and a grinding tool, this aperture being bordered by an outwardly directed flange $f^3$ which is sharply bent off from front wall F. The aperture $f^2$ is closed by a plate G having an outwardly directed flange $g^1$ and inwardly projects beyond the inner surface of front wall F to such an extent that, seen in lateral direction, the rounded-off edge by which the plate G subsides into flange $g^1$ lies above the inner surface of front wall F. The flanges $f^3$ and $g^1$ are interconnected by a resistance weld H as close as possible to the front wall.

In manufacturing the described drum one proceeds in the following manner: The front wall F is inserted first in the shell B $B^1$ $B^2$ and joined thereto by the welds D and E. After welding the free edge of flange $f^1$ is ground off to such an extent that it subsides without any shoulder into the shell, as illustrated in Figure 2. Thereupon the front wall C is inserted and welded and ground off in the same manner, the respective members of the welding apparatus and the grinding tool being introduced through the aperture $f^2$. This done, plate G is inserted in aperture $f^2$, whereupon the flanges $f^3$ and $g^1$ are interconnected by the resistance weld H.

As to be seen from the foregoing, the described drum affords the advantage above mentioned of no corners existing therein where impurities might remain. Furthermore, owing to the described shape of flange $f^3$ and the weld H no impurities can deposit also on the joint between the parts F and G.

What I claim is:—

1. A metal drum one front wall of which has an inwardly directed flange inserted in and joined to the shell by a resistance welded joint, so large an aperture being provided in one of the front walls as to admit introduction of resistance welding means in the drum, said aperture being bordered by a sharply bent-off outwardly directed flange and covered by a plate projecting inwardly beyond the internal surface of the appurtenant front wall and having an outwardly directed flange, said two outwardly directed flanges being inter-connected by a resistance welded joint as close as possible to the front wall.

2. A metal drum one front wall of which has an inwardly directed flange inserted in and joined to the shell both by a resistance weld directly on its free edge and another weld behind said resistance weld, the free edge of said flange having a ground surface subsiding smoothly into the wall of said drum without any shoulder.

3. A metal drum according to claim 2, an aperture in at least one of the front walls to admit resistance welding and grinding apparatus for forming said joints and grinding sharply said flange edge.

4. A metal drum one front wall of which has an inwardly directed flange inserted in and joined to the shell by a resistance-welded joint, one front wall consisting of a ring-shaped outer portion and a circular plate portion resistance-welded to said ring-shaped portion, whereby resistance-welding apparatus may be introduced into the drum within said ring-shaped outer portion previous to the welding of said circular plate portion thereto.

5. A metal drum the front walls of which have each an inwardly directed flange inserted in and joined to the shell by a resistance-welded joint, one front wall consisting of a ring-shaped outer portion and a circular plate portion resistance-welded to said ring-shaped portion, whereby resistance-welding apparatus may be introduced into the drum within said ring-shaped outer portion previous to the welding of said circular plate portion thereto.

6. A metal drum comprising a shell and two front walls, inwardly directed flanges upon said front walls inserted in and joined to the shell by resistance-welded joints, said flanges having their free ends subsiding smoothly into the wall of said shell without any shoulders, one front wall consisting of a ring-shaped outer portion and a circular plate portion resistance-welded to said ring-shaped portion, whereby resistance-welding apparatus may be introduced into the drum within said ring-shaped outer portion previous to the welding of said circular plate portion thereto.

The foregoing specification signed at Cologne, Germany, this 16th day of May, 1930.

PETER WOLF.